(12) United States Patent
Shibata et al.

(10) Patent No.: US 8,844,268 B2
(45) Date of Patent: Sep. 30, 2014

(54) ABNORMALITY DETECTION APPARATUS FOR EXHAUST GAS PURIFICATION APPARATUS AND ABNORMALITY DETECTION METHOD FOR EXHAUST GAS PURIFICATION APPARATUS

(75) Inventors: Daisuke Shibata, Numazu (JP); Satoshi Endo, Susono (JP); Taiga Hagimoto, Susono (JP); Hiroshi Sawada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 585 days.

(21) Appl. No.: 13/121,782

(22) PCT Filed: Jan. 19, 2009

(86) PCT No.: PCT/JP2009/050671
§ 371 (c)(1),
(2), (4) Date: Mar. 30, 2011

(87) PCT Pub. No.: WO2010/082354
PCT Pub. Date: Jul. 22, 2010

(65) Prior Publication Data
US 2011/0265461 A1    Nov. 3, 2011

(51) Int. Cl.
*F01N 3/00* (2006.01)
*F01N 3/10* (2006.01)
*F01N 11/00* (2006.01)
*F01N 3/20* (2006.01)

(52) U.S. Cl.
CPC .................. *F01N 11/00* (2013.01); *Y02T 10/24* (2013.01); *Y02T 10/47* (2013.01); *F01N 3/208* (2013.01); *F01N 2610/02* (2013.01); *F01N 2900/1616* (2013.01); *F01N 2550/05* (2013.01)
USPC .................. 60/277; 60/274; 60/276; 60/286; 60/295; 60/301; 60/303

(58) Field of Classification Search
CPC ..... F01N 11/00; F01N 3/208; F01N 2610/02; F01N 2900/1616; F01N 2550/05; Y02T 10/24; Y02T 10/47

USPC ............ 60/274, 277, 286, 295, 301, 303, 276
See application file for complete search history.

(56) References Cited

U.S. PATENT DOCUMENTS

| | | |
|---|---|---|
| 6,367,320 B1 | 4/2002 | Kueper et al. |
| 2008/0178656 A1 | 7/2008 | Nieuwstadt et al. |
| 2009/0301059 A1 | 12/2009 | Toshioka et al. |

FOREIGN PATENT DOCUMENTS

| | | |
|---|---|---|
| EP | 1 426 575 A1 | 6/2004 |
| JP | A-2001-3737 | 1/2001 |

(Continued)

OTHER PUBLICATIONS

International Search Report for International Patent Application No. PCT/JP2009/050671, mailed on Apr. 21, 2009 (w/ English translation).

*Primary Examiner* — Thomas Denion
*Assistant Examiner* — Diem Tran
(74) *Attorney, Agent, or Firm* — Oliff PLC

(57) ABSTRACT

It is determined quickly whether there is a shortage in reducing agent supplied to an NOx selective reduction catalyst. After it is determined that a quantity of reducing agent equal to or larger than a predetermined quantity is absorbed in the NOx selective reduction catalyst on the assumption that there is no abnormality in reducing agent supply unit, the supply of a quantity of reducing agent needed to reduce a quantity of NOx flowing into the NOx selective reduction catalyst is started. A determination of an abnormality in the reducing agent supply unit is made based on the NOx removal rate after the lapse of a predetermined period of time since the start of the supply of reducing agent. The NOx removal rate becomes lower when there is an abnormality in the reducing agent supply unit.

10 Claims, 9 Drawing Sheets

(56) References Cited

FOREIGN PATENT DOCUMENTS

| JP | A-2003-293743 | 10/2003 |
| JP | A-2003-314258 | 11/2003 |
| JP | A-2004-176719 | 6/2004 |
| JP | A-2005-226504 | 8/2005 |
| JP | A-2008-190529 | 8/2008 |
| JP | A-2008-196340 | 8/2008 |
| JP | A-2008-274765 | 11/2008 |

US 8,844,268 B2

ABNORMALITY DETECTION APPARATUS FOR EXHAUST GAS PURIFICATION APPARATUS AND ABNORMALITY DETECTION METHOD FOR EXHAUST GAS PURIFICATION APPARATUS

TECHNICAL FIELD

The present invention relates to an abnormality detection apparatus for an exhaust gas purification apparatus of an internal combustion engine and an abnormality detection method for an exhaust gas purification apparatus of an internal combustion engine.

BACKGROUND ART

There is a known technology in which it is determined that an exhaust gas processing system is defective if a signal of a sensor provided in the exhaust system does not change in the same manner as in the initial state as the quantity of reducing agent supplied to an NOx selective reduction catalyst is changed (see, for example, Patent Document 1).

However, if the quantity of supplied reducing agent becomes excessively large with the change of the quantity of the reducing agent, there is a possibility that the reducing agent will slip through the catalyst. On the other hand, if the quantity of supplied reducing agent is insufficient, there is a possibility that harmful substances in the exhaust gas cannot be removed. Furthermore, it takes time for the sensor signal to change after the changing of the quantity of supplied reducing agent. If the operation state of the internal combustion engine changes before the sensor signal changes, there is a possibility that the aforementioned determination cannot be made. In consequence, there is a possibility that the aforementioned determination will take time.

Patent Document 1: Japanese Patent Application Laid-Open No. 2004-176719
Patent Document 2: Japanese Patent Application Laid-Open No. 2008-196340
Patent Document 3: Japanese Patent Application. Laid-Open No. 2005-226504
Patent Document 4: Japanese Patent Application Laid-Open No. 2008-190529

DISCLOSURE OF THE INVENTION

Problem to be Solved by the Invention

The present invention has been made in view of the above-described problems, and its object is to quickly determine whether or not there is a shortage in the quantity of reducing agent supplied to an NOx selective reduction catalyst.

Means for Solving the Problem

To achieve the above object, an abnormality detection apparatus for an exhaust gas purification apparatus employs the following means. Specifically, the abnormality detection apparatus for an internal combustion engine according to the present invention comprises:

an NOx selective reduction catalyst provided in an exhaust passage of an internal combustion engine to selectively reduce NOx with a reducing agent;

reducing agent supply unit for supplying reducing agent from upstream of said NOx selective reduction catalyst;

downstream NOx quantity detection unit for detecting the quantity of NOx in downstream of said NOx selective reduction catalyst;

upstream NOx quantity detection unit for detecting the quantity of NOx in upstream of said NOx selective reduction catalyst;

removal rate calculation unit for calculating an NOx removal rate in said NOx selective reduction catalyst based on the quantity of NOx detected by said downstream NOx quantity detection unit and the NOx quantity detected by said upstream NOx quantity detection unit;

absorption determination unit for determining whether or not a quantity of reducing agent equal to or larger than a predetermined quantity is absorbed in said NOx selective reduction catalyst on the assumption that there is no abnormality in said reducing agent supply unit;

supply quantity calculation unit for calculating a supply quantity of reducing agent needed to reduce the quantity of NOx detected by said upstream NOx quantity detection unit; and abnormality determination unit for determining an abnormality of said reducing agent supply unit based on said NOx removal rate after the lapse of a predetermined period of time since the start of the supply of the quantity of reducing agent calculated by said supply quantity calculation unit after it is determined by said absorption determination unit that a quantity of reducing agent equal to or larger than the predetermined quantity is absorbed in said NOx selective reduction catalyst.

The abnormality in the reducing agent supply unit refers to a situation in which the reducing agent supply quantity has decreased from an ordered quantity by an extent beyond an allowable range. This may be a situation in which the quantity of reducing agent supplied by the reducing agent supply unit has decreased by an extent beyond an allowable range from the quantity of reducing agent supplied by the reducing agent supply unit at the time when it was brand-new. The decrease in the reducing agent supply quantity may be either a decrease in the supply quantity per unit time or a decrease in the supply quantity caused by a decrease in the duration of the supply of reducing agent.

In the present invention, the NOx removal rate refers to the ratio of the quantity of NOx removed in the NOx selective reduction catalyst to the quantity of NOx in upstream of the NOx selective reduction catalyst. The quantity of NOx removed in the NOx selective reduction catalyst can be calculated by subtracting the quantity of NOx in downstream of the NOx selective reduction catalyst from the quantity of NOx in upstream if the NOx selective reduction catalyst. The NOx removal rate can be calculated by dividing the quantity of removed NOx by the quantity of NOx detected by the upstream NOx quantity detection unit.

The downstream NOx quantity detection unit and the upstream NOx quantity detection unit may measure the NOx concentration and the flow rate of the exhaust gas and calculate the quantity of NOx from them.

The absorption determination unit makes a determination based on the quantity of absorbed reducing agent on the assumption that there is no abnormality in the reducing agent supply unit, and it is not necessary to detect the actual quantity of absorbed reducing agent. When there are no abnormalities in the reducing agent supply unit and the NOx selective reduction catalyst, a quantity of reducing agent equal to or larger than the predetermined quantity can be absorbed. On the other hand, when there is an abnormality in either of them, there can be a case in which a quantity of reducing agent equal to or larger than the predetermined quantity is not absorbed actually. The absorption determination unit may determine that a quantity of reducing agent equal to or larger than the predetermined quantity is absorbed, if reducing agent is supplied in a predetermined condition. Furthermore, the absorption determination unit may estimate the quantity of reducing agent absorbed in the NOx selective reduction catalyst based on the reducing agent supply quantity and the quantity of reducing agent consumed in the NOx selective reduction catalyst.

The reducing agent supply quantity calculated by the supply quantity calculation unit may be equal to the quantity of reducing agent consumed to reduce NOx contained in the exhaust gas. The quantity of reducing agent absorbed in the NOx selective reduction catalyst decreases as it reduces NOx in the exhaust gas. The supply quantity calculation unit calculates this decreased quantity. Since the quantity of reducing agent absorbed in the NOx selective reduction catalyst can be maintained at a high level by supplying the quantity of reducing agent calculated by the supply quantity calculation unit, the NOx removal rate can be maintained at a high level. Furthermore, since an excessive supply of reducing agent can be avoided, the reducing agent is prevented from slipping through the NOx selective reduction catalyst.

However, if there is an abnormality in the reducing agent supply unit, the actual supply quantity of reducing agent becomes smaller than the required supply quantity of reducing agent, and therefore the quantity of reducing agent calculated by the supply quantity calculation unit cannot be supplied. Therefore, though the quantity of reducing agent absorbed in the NOx selective reduction catalyst decreases with the reduction of NOx contained in the exhaust gas, a quantity of reducing agent equal to the decreased quantity cannot be newly supplied. In consequence, the quantity of absorbed reducing agent decreases gradually, and accordingly the NOx removal rate decreases gradually.

Therefore, an abnormality in the reducing agent supply unit can be determined based on the NOx removal rate at a time when the quantity of reducing agent calculated by the supply quantity calculation unit is supplied after it is determined that a quantity of reducing agent equal to or larger than the predetermined quantity is absorbed in the NOx selective reduction catalyst. Specifically, if the NOx removal rate is decreasing gradually, it may be determined that there is an abnormality in the reducing agent supply unit. On the other hand, if there is no abnormality in the reducing agent supply unit, the NOx removal rate remains substantially constant, because the absorption quantity is maintained to be equal to or larger than the predetermined quantity.

The predetermined period of time may be a time taken for an influence of abnormalities, if any, of the reducing agent supply unit to appear as a decrease in the NOx removal rate. Alternatively, it may be a time taken for the NOx removal rate to decrease to a value that allows a determination of an abnormality in the reducing agent supply unit. The predetermined quantity may be a quantity that allows a detection of a decrease in the NOx removal rate when there is an abnormality in the reducing agent supply unit.

In the case where the NOx selective reduction catalyst is deteriorated, the NOx removal rate does not decrease in a short time, though the NOx removal rate becomes lower than that in the case where the NOx selective reduction catalyst is in order. In other words, the NOx removal rate is higher than that in the case where there is an abnormality in the reducing agent supply unit. Based on this, it is possible to determine whether there is an abnormality in the reducing agent supply unit or the catalyst is deteriorated.

In the present invention, said absorption determination unit may determine, after a condition that makes the quantity of reducing agent absorbed in said NOx selective reduction catalyst smaller than the predetermined quantity is established, that a quantity of reducing agent equal to or larger than the predetermined quantity is absorbed in said NOx selective reduction catalyst, if an increased quantity of reducing agent that is larger than that in the case where said condition is not established has been supplied.

The increased quantity of reducing agent may be any quantity larger than the quantity calculated by the supply quantity calculation unit. For example, the reducing agent absorbed in the NOx selective reduction catalyst desorbs from the NOx selective reduction catalyst when the temperature becomes high. After such a condition is established, the quantity of reducing agent absorbed in the NOx selective reduction catalyst will be smaller than the quantity needed to remove NOx. In view of this, the quantity of reducing agent is increased to be larger than a regular quantity so as to quickly recover the NOx removal capability. In other words, the quantity of reducing agent absorbed in the NOx selective reduction catalyst is quickly increased by increasing the reducing agent supply quantity. After an increased quantity of reducing agent has been supplied, a certain quantity of reducing agent is absorbed in the NOx selective reduction catalyst even if there is an abnormality in the reducing agent supply unit. The time after a condition that makes the quantity of reducing agent absorbed in said NOx selective reduction catalyst smaller than the predetermined quantity is established may be a time after the temperature of the NOx selective reduction catalyst has risen to a desorption temperature of the reducing agent.

If there is no abnormality in the reducing agent supply unit, a high NOx removal rate can be maintained, because a quantity of reducing agent sufficient for removal of NOx is absorbed in the NOx selective reduction catalyst after the supply of an increased quantity of reducing agent. On the other hand, if there is an abnormality in the reducing agent supply unit, the NOx removal rate decreases gradually, because the quantity of absorbed reducing agent decreases gradually. Therefore, after the supply of an increased quantity of reducing agent, a decrease in the NOx removal rate can easily be detected. In consequence, a highly accurate determination of an abnormality can be achieved.

In the present invention, the apparatus may comprise estimation unit for estimating the change in the NOx removal rate with time when the quantity of reducing agent supplied through said reducing agent supply unit reaches a lower limit of an allowable range, and said predetermined period of time may be a time taken for the NOx removal rate estimated by said estimation unit to decrease to a threshold value since the detection of the supply of reducing agent by said absorption determination unit.

The estimation unit may estimate the change in the NOx removal rate with time on the assumption that the condition of the reducing agent supply unit is on the border between normal and abnormal. The predetermined period of time is set to a time taken for this estimated value to decrease to the threshold value. The threshold value may be set equal to the NOx removal rate in the case where there is an abnormality in the reducing agent supply unit. Thus, a time at which a determination of an abnormality in the reducing agent supply unit is to be made can be set. Specifically, since the NOx removal rate estimated by the estimation unit is the lower limit value, it may be determined that there is an abnormality in the reducing agent supply unit if the actual NOx removal rate after the lapse of the predetermined period of time is lower than this value.

Said estimation unit may estimate the NOx removal rate with an initial value of the quantity of reducing agent absorbed in said NOx selective reduction catalyst set to 0 (zero).

In connection with the above, the NOx removal rate can be estimated by estimating the quantity of reducing agent absorbed in the NOx selective reduction catalyst. When it is assumed that the initial value of the quantity of absorbed reducing agent is equal to 0, the time taken for the quantity of reducing agent to decrease to the threshold value after the supply of an increased quantity of reducing agent becomes shorter, and consequently said predetermined period of time becomes shorter. Therefore, there may be cases in which it is determined that there is no abnormality in the reducing agent, while it would be determined in the same case that there is an abnormality if the initial value of the quantity of absorbed reducing agent were set to a value larger than 0. However, since the actual value of the NOx removal rate is equal to or higher than the threshold value, removal of NOx is achieved satisfactorily. In this case, it is determined that there is no abnormality in the reducing agent supply unit. This can provide a determination of an abnormality adapted to the actual NOx removal rate.

In the present invention, said abnormality determination unit may determine that there is an abnormality in said reducing agent supply unit if the NOx removal rate calculated by said removal rate calculation unit after the lapse of said predetermined period of time is lower than a threshold value.

The threshold value may be set equal to the NOx removal rate in the case where there is an abnormality in the reducing agent supply unit. Then, if the NOx removal rate after the lapse of the predetermined period of time is lower than the threshold value, it may be determined that a sufficient quantity of reducing agent is not supplied through the reducing agent supply unit.

In the present invention, said abnormality determination unit may obtain the degree of decrease in the NOx removal rate from the NOx removal rate at the time when the supply of the quantity of reducing agent calculated by said supply quantity calculation unit is started and the NOx removal rate after the lapse of said predetermined period of time and determine that there is an abnormality in said reducing agent supply unit if the degree of decrease in the NOx removal rate is larger than a threshold value.

When the quantity of absorbed reducing agent is enough, the NOx removal rate remains substantially constant, even if the NOx selective reduction catalyst is deteriorated. However, when the quantity of absorbed reducing agent is not enough, the NOx removal rate decreases. The smaller the quantity of supplied reducing agent is, the larger the degree of decrease in the NOx removal rate is. Therefore, a determination of an abnormality in the reducing agent can be made based on the degree of decrease in the NOx removal rate. A determination of an abnormality in the reducing agent supply unit can be made based on the difference between or ratio of the NOx removal rate at the time of starting the supply of the quantity of reducing agent calculated by the supply quantity calculation unit and the NOx removal rate after the lapse of the predetermined period of time.

In the present invention, said downstream NOx quantity detection unit may also detect the quantity of reducing agent; said removal rate calculation unit may take the quantity of reducing agent detected by said downstream NOx quantity detection unit as the quantity of NOx when calculating the NOx removal ratio; the abnormality detection apparatus may comprise feedback control unit for performing a feedback control of the quantity of reducing agent supplied by said reducing agent supply unit based on said NOx removal rate; and even when it is determined by said abnormality determination unit that there is an abnormality in said reducing agent supply unit, if the quantity of reducing agent is made smaller than a base value by said feedback control unit, the abnormality detection apparatus may determine that there is not an abnormality in said reducing agent supply unit but said NOx selective reduction catalyst is deteriorated.

Since the downstream NOx quantity detection unit detects the quantity of reducing agent also as the quantity of NOx, if the quantity of reducing agent in the exhaust gas increases, it is determined that there is a decrease in the NOx removal rate. The feedback control unit compensates the quantity of supplied reducing agent so that the NOx removal rate becomes higher or falls within a predetermined range.

When there is a shortage in the reducing agent supply quantity due to an abnormality in the reducing agent supply unit, an increase in the quantity of supplied reducing agent will cause a rise in the NOx removal rate. On the other hand, if the quantity of reducing agent that can be absorbed in the NOx selective reduction catalyst decreases due to a deterioration of the NOx selective reduction catalyst, the NOx removal rate decreases, because a portion of reducing agent slips through the catalyst and is detected by the downstream NOx quantity detection unit. When this is the case, a decrease in the reducing agent supply quantity will cause a rise in the NOx removal rate, because the quantity of reducing agent slipping through the catalyst is decreased.

When the above feedback control is performed, the NOx removal rate can decrease in the case of a deterioration of the NOx selective reduction catalyst like in the case of an abnormality in the reducing agent supply unit. Therefore, it is difficult to discriminate between abnormalities of the reducing agent supply unit and deteriorations of the NOx selective reduction catalyst based only on the NOx removal rate.

However, the reducing agent supply quantity is compensated in the feedback control in the increasing direction in the case of an abnormality in the reducing agent supply unit, while it is compensated in the decreasing direction in the case of a deterioration of the NOx selective reduction catalyst. Specifically, in the case of an abnormality in the reducing agent supply unit, the reducing agent supply quantity is increased to raise the NOx removal rate. On the other hand, in the case of a deterioration of the NOx selective reduction catalyst, the reducing agent supply quantity is decreased to prevent slipping-through of the reducing agent. It is possible to discriminate between abnormalities in the reducing agent supply unit and deteriorations of the NOx selective reduction catalyst base on the direction of compensation.

To achieve the above object, an abnormality detection method for an internal combustion engine according to the present invention employs the following means. The abnormality detection method for an internal combustion engine according to the present invention comprises:

a first step of supplying a quantity of reducing agent that causes a quantity of reducing agent equal to or larger than a predetermined quantity to be absorbed in an NOx selective reduction catalyst provided in an exhaust passage of an internal combustion engine;

a second step of supplying, after said first step, a quantity of reducing agent needed to reduce NOx in exhaust gas; and a third step of determining a shortage in supply of reducing agent based on an NOx removal rate after the lapse of a predetermined period of time since the start of said second step.

Said first step may be performed after the temperature of said NOx selective reduction catalyst has risen to a desorption temperature of the reducing agent, by supplying an increased quantity of reducing agent larger than that during the time in which the temperature of said NOx selective reduction catalyst is lower than the desorption temperature.

In said third step, it may be determined that there is a shortage in supply of reducing agent, if the NOx removal rate is lower than a threshold value.

Advantageous Effect of the Invention

According to the present invention, it can be determined quickly whether or not there is a shortage in the quantity of reducing agent supplied to the NOx selective reduction catalyst.

DESCRIPTION OF THE REFERENCE NUMERALS AND SYMBOLS

Figure 1:
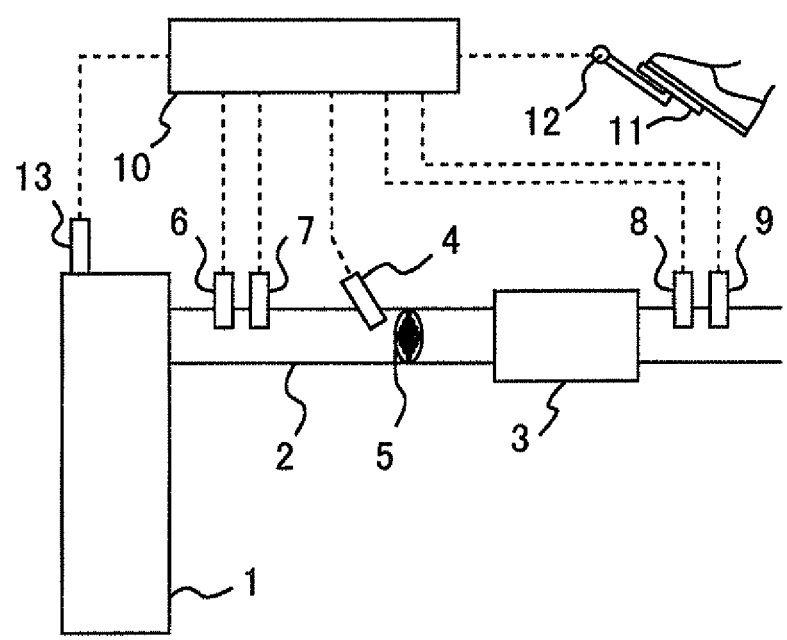
FIG. 1 is a diagram showing the basic configuration of an internal combustion engine and its exhaust system according to an embodiment.

1: internal combustion engine
2: exhaust passage
3: NOx selective reduction catalyst
4: injection valve
5: diffusion plate
6: first NOx sensor
7: first temperature sensor
8: second NOx sensor
9: second temperature sensor
10: ECU
11: accelerator pedal
12: accelerator opening degree sensor
13: crank position sensor

THE BEST MODE FOR CARRYING OUT THE INVENTION

In the following, specific embodiments of the abnormality detection apparatus for an exhaust gas purification apparatus according to the present invention will be described with reference to the drawings.

Embodiment 1

FIG. 1 shows the basic configuration of the internal combustion engine and its exhaust system according to this embodiment. The internal combustion engine 1 shown in FIG. 1 is a water-cooled, four-stroke-cycle diesel engine having four cylinders.

The internal combustion engine is connected with an exhaust passage 2. An NOx selective reduction catalyst 3 (which will be hereinafter referred to as the "catalyst 3") is provided in the middle of the exhaust passage 2. An injection valve 4 that injects urea into the exhaust gas is provided in the exhaust passage 2 upstream of the catalyst 3. The injection valve 4 opens in response to a signal from a later-described ECU 10 to supply urea into the exhaust gas. In this embodiment, the injection valve 4 corresponds to the reducing agent supply unit in the present invention.

Downstream of the injection valve 4 is provided a diffusion plate 5 on which urea strikes so that urea is diffused or distributed over a wide range. The diffusion plate 5 is, for example, a plate arranged perpendicular to the direction of flow of the exhaust gas, and it may be a plate having a plurality of holes. Alternatively, it may be a metal grid.

The urea injected through the injection valve 4 is hydrolyzed by the heat of the exhaust gas to produce ammonia, which adheres to the catalyst 3. This ammonia reduces NOx. In connection with this, a hydrolysis catalyst may be provided downstream of the diffusion plate 5 and upstream of the catalyst 3.

A first NOx sensor 6 that measures the NOx concentration in the exhaust gas and a first temperature sensor 7 that measures the temperature of the exhaust gas are attached to the exhaust passage 2 upstream of the injection valve 4. A second NOx sensor 8 that measures the NOx concentration in the exhaust gas and a second temperature sensor 9 that measures the temperature of the exhaust gas are attached to the exhaust passage 2 downstream of the catalyst 3. Since the first NOx sensor 6 and the second NOx sensor 8 detect ammonia as well as NOx, if the ammonia concentration in the exhaust gas is high, it is determined that the NOx concentration is high. The quantity of NOx can be calculated based on the NOx concentration determined by these sensors and the flow rate of the exhaust gas. The first NOx sensor 6 and the second NOx sensor 8 may be sensors that measure the quantity of NOx. In this embodiment, accordingly, the first NOx sensor 6 corresponds to the upstream NOx quantity detection unit in the present invention. The second NOx sensor 8 in this embodiment corresponds to the downstream NOx quantity detection unit in the present invention.

An ECU 10 or an electronic control unit for controlling the internal combustion engine 1 is annexed to the internal combustion engine 1 having the above-described configuration. The ECU 10 is a unit that controls the internal combustion engine 1 and the exhaust gas purification apparatus in accordance with the operation conditions of the internal combustion engine 1 and requests made by the driver.

The ECU 10 is connected by electrical wiring with the aforementioned sensors, an accelerator opening degree sensor 12 that outputs an electrical signal indicative of the amount of depression of an accelerator pedal 11 by the driver to allow the determination of the engine load, and a crank position sensor 13 that detects the engine speed. Output signals of these various sensors are adapted to be input to the ECU 10.

On the other hand, the ECU 10 is connected by electrical wiring with the injection valve 4, and the opening/closing timing of the injection valve 4 is controlled by the ECU 10.

The ECU 10 calculates the NOx removal rate in the catalyst 3. Firstly, the difference between the NOx quantity obtained by the first NOx sensor 6 and the NOx quantity obtained by the second NOx sensor 8 is calculated. This difference is the quantity of NOx removed in the catalyst 3. Then, the NOx removal rate can be obtained by dividing the quantity of NOx removed in the catalyst 3 by the quantity of NOx obtained by the first NOx sensor 6. In this embodiment, the ECU 10 that calculates the NOx removal rate corresponds to the removal rate calculation unit in the present invention.

In this embodiment, when it is determined that the quantity of ammonia absorbed in the catalyst 3 is not large enough, an increased quantity of ammonia is supplied to quickly increase the quantity of ammonia absorbed in the catalyst 3. Then, a determination of abnormalities in the supply of ammonia is made based on the NOx removal rate in the catalyst 3 thereafter. In cases where the system is provided with a filter for trapping PM in the exhaust gas, it may be determined that the quantity of ammonia absorbed in the catalyst 3 is insufficient when filter regeneration for oxidizing PM by raising the temperature of the filter is performed. In cases where the system is provided with an NOx storage reduction catalyst, it may be determined that the quantity of ammonia absorbed in the catalyst 3 is insufficient when a control for eliminating sulfur poisoning is performed. Furthermore, it may be determined that the quantity of ammonia absorbed in the catalyst 3 is insufficient when a temperature raising control for quickly raising the temperature of the catalyst 3 is performed.

The ammonia absorbed in the catalyst 3 desorbs from the catalyst 3 as the temperature of the catalyst 3 becomes high. The ammonia desorbs due to a rise in the temperature of the catalyst 3 upon regeneration of the filter, upon elimination of sulfur poisoning, and upon a temperature rise of the catalyst 3. Thereafter, an increased quantity of ammonia larger than usual is supplied to quickly restore the NOx removal rate. Consequently, a large quantity of ammonia is absorbed by the catalyst 3 in a short time. Thus, the NOx removal rate can be raised quickly. In this embodiment, a determination of abnormalities in the supply of ammonia is made immediately after the process of having a large quantity of ammonia absorbed is performed. Even while a regular quantity of ammonia is being supplied in order to reduce NOx, a determination of abnormalities in the supply of ammonia may be made if a large quantity of ammonia is absorbed by the catalyst 3. Specifically, it may be made after the ECU 10 controls the injection valve 4 so that a large quantity of ammonia is absorbed by the catalyst 3. For example, under the assumption that there is no abnormality in the injection valve 4, the determination may be made after a control for allowing a quantity of ammonia equal to or larger than a predetermined quantity to be absorbed by the catalyst 3. In this embodiment, the ECU 10 that determines whether a control allowing a quantity of ammonia equal to or larger than the predetermined quantity to be absorbed by the catalyst 3 has been performed or not corresponds to the absorption determination unit in the present invention.

In this embodiment, abnormalities in the supply of ammonia refer to situations in which the actual supply quantity is smaller than an ammonia supply quantity calculated by the ECU 10 (which will be hereinafter referred to as the "ordered quantity"). Abnormalities as such include abnormalities in the apparatus for supplying urea to the injection valve 4 (such as a pump, tank and channel) in addition to failures of the injection valve 4. Abnormalities including them will sometimes be referred to as abnormalities in the injection valve 4, hereinafter.

Figure 2:
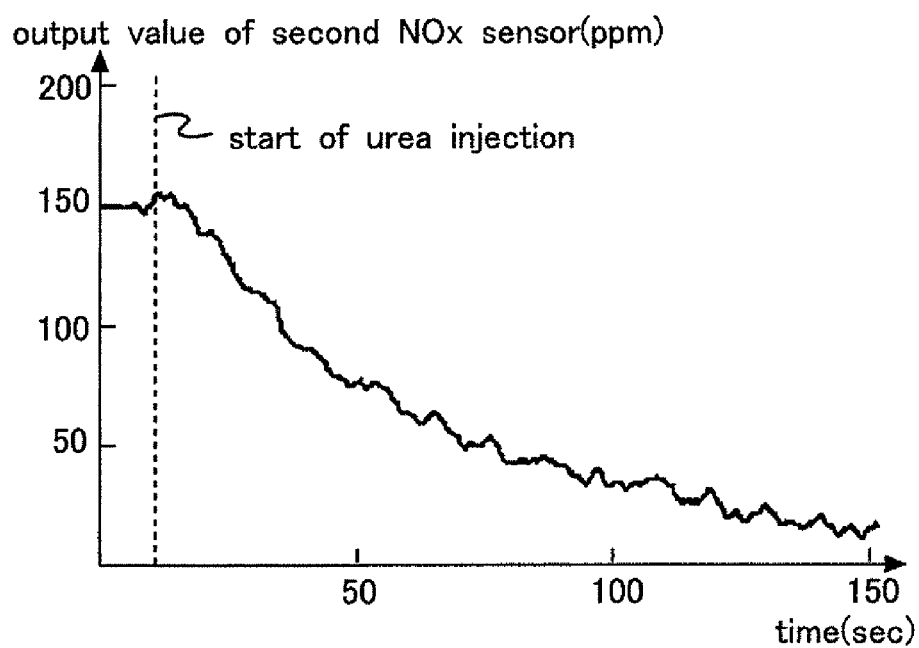
FIG. 2 is a graph showing the change in the NOx concentration measured by a second NOx sensor with time when urea is supplied after the desorption of ammonia from a catalyst.

FIG. 2 is a graph showing the NOx concentration measured by the second NOx sensor 8 that changes with time when urea is supplied after the desorption of ammonia from the catalyst 3. FIG. 2 shows the NOx concentration in a case in which there is no abnormality in the injection valve 4 and the catalyst 3 is at a temperature of 200° C., while a control for supplying an increased quantity of urea is not performed.

After the start of urea injection, the quantity of ammonia absorbed in the catalyst 3 increases, and the NOx removal rates rises accordingly. Therefore, the NOx concentration in the region downstream of the catalyst 3 decreases gradually. Since NOx is reduced in the catalyst 3 even during the urea injection, a corresponding amount of ammonia is consumed. Therefore, it takes time for the NOx removal rate to become high, In this embodiment, the quantity of ammonia absorbed in the catalyst 3 is increased quickly by making the quantity of supplied urea larger than the regular quantity after the desorption of ammonia absorbed in the catalyst 3. In other words, with an increase in the quantity of supplied urea to a quantity larger than the regular quantity, the NOx concentration measured by the second NOx sensor 8 decreases more quickly than in the case shown in FIG. 2. This increase in the quantity of urea can be achieved by an increase in the injection quantity per unit time or by increasing the urea injection period or decreasing the injection suspension period in intermittent injection of urea. When there is an abnormality in the injection valve 4, the degree of decrease in the NOx concentration in the region downstream of the catalyst 3 becomes lower.

In this embodiment, when a quantity of ammonia equal to or larger than a predetermined quantity is absorbed in the catalyst, the urea supply quantity is determined based on the quantity of NOx flowing into the catalyst 3. Namely, urea is supplied in accordance with the quantity of ammonia consumed to reduce NOx. The supply quantity at this time is referred to as the regular supply quantity. When there is no abnormality in the injection valve 4, the quantity of ammonia absorbed in the catalyst 3 will be always the same, because the quantity of consumed ammonia and the quantity of newly absorbed ammonia are equal to each other. In this embodiment, the ECU 10 that calculates the urea supply quantity in accordance with the quantity of NOx flowing into the catalyst 3 corresponds to the supply quantity calculation unit in the present invention.

When there is an abnormality in the injection valve 4, since a quantity of urea smaller than the ordered quantity is supplied, the quantity of newly absorbed ammonia is smaller than the quantity of consumed ammonia. In consequence, the quantity of ammonia absorbed in the catalyst 3 decreases gradually in spite of the supply of urea through the injection valve 4. Consequently, the NOx removal rate in the catalyst 3 decreases gradually.

Figure 3:
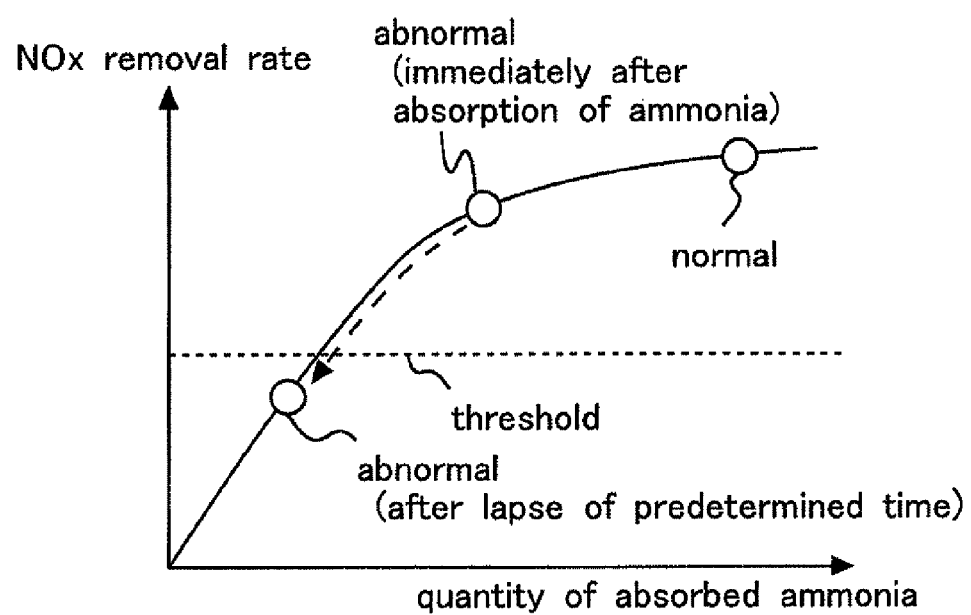
FIG. 3 is a graph showing the relationship between the quantity of ammonia absorbed in the catalyst and the NOx removal rate.

FIG. 3 is a graph showing the relationship between the quantity of ammonia absorbed in the catalyst 3 and the NOx removal rate. The larger the quantity of ammonia absorbed in the catalyst 3 is, the higher the NOx removal rate is. The smaller the quantity of ammonia absorbed in the catalyst 3 is, the lower the NOx removal rate is. Therefore, when the quantity of ammonia absorbed in the catalyst 3 decreases, the quantity of supplied urea is increased to thereby increase the quantity of absorbed ammonia quickly. Thereafter, since ammonia is newly supplied in accordance with the ammonia consumption if the injection valve 4 is in order, the NOx removal rate is maintained at a high level. On the other hand, if there is an abnormality in the injection valve 4, the quantity of absorbed ammonia is small even immediately after the supply of an increased quantity of urea (or immediately after the absorption of ammonia), because the quantity of supplied urea is smaller than the ordered quantity. Nevertheless, the supply of an increased quantity of urea ensures an NOx removal rate that is not lower than a threshold value or the lowest value of the allowable range, immediately after the supply. However, during the subsequent period of urea supply, the quantity of supplied urea is insufficient for the quantity of NOx. Consequently the quantity of absorbed ammonia decreases gradually, and the NOx removal rate will become lower than the threshold value after the lapse of a certain time.

Therefore, a determination of abnormalities in the injection valve 4 can be made by comparing the NOx removal rate immediately after the absorption of ammonia in the catalyst 3 and the NOx removal rate after the lapse of a predetermined period of time. This predetermined period of time may be set as a time taken for an abnormality in the injection valve 4 to affect the NOx removal rate since the completion of the supply of an increased quantity of urea or the start of the supply of the regular quantity of urea. An optimum value for this predetermined period of time may be determined by an experiment. Alternatively, it may be set as a specific value.

A determination of abnormalities in the injection valve 4 may be made based on the degree of decrease in the NOx removal rate that is obtained from the NOx removal rate immediately after the supply of an increased quantity of urea and the NOx removal rate after the lapse of a predetermined period of time. For example, it may be determined that there is an abnormality in the injection valve 4 if the degree of decrease in the NOx removal rate is equal to or higher than a threshold value. In addition, the degree of decrease in the quantity of urea supplied through the injection valve 4 may be determined based on the degree of decrease in the NOx removal rate. Alternatively, a determination of abnormalities in the injection valve 4 may be made based only on the NOx removal rate after the lapse of a predetermined period of time since the time immediately after the supply of an increased quantity of urea. Specifically, it may be determined that there is an abnormality in the injection valve 4 if the NOx removal rate after the lapse of the predetermined period of time is lower than a threshold value. In this embodiment, the ECU 10 that makes the aforementioned determinations corresponds to the abnormality determination unit in the present invention.

Figure 4:
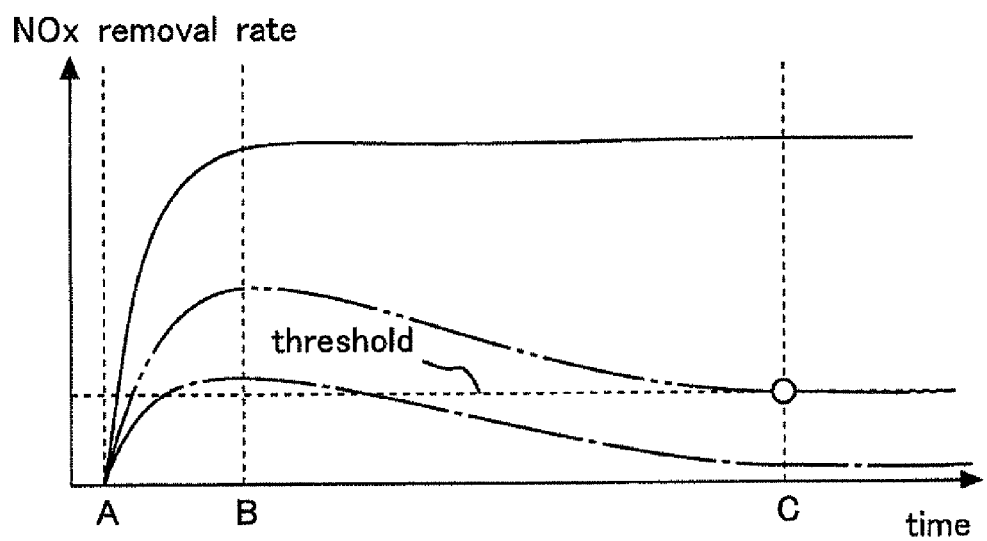
FIG. 4 is a graph showing the change in the NOx removal rate with time.

FIG. 4 is a graph showing the change in the NOx removal ratio with time. The solid curve is for a case where the injection valve 4 is in order, and the alternate long and short dashed curve is for a case where there is an abnormality in the injection valve 4. The chain double dashed curve is for a case where the quantity of supplied urea is at the lower limit of the allowable range while the injection valve 4 is in order. The chain double dashed curve may be considered to represent the change in the NOx removal rate with time in a case where the condition of the injection valve 4 is on the border between normal and abnormal. The threshold value is the lower limit of the allowable range of the NOx removal rate. During the period between time A to time B an increased quantity of urea is supplied through the injection valve 4, while during the period after time B the regular quantity of urea is supplied. The period from time B to time C is the aforementioned predetermined period of time.

In other words, the predetermined period of time ends at the time when the NOx removal rate becomes equal to the threshold value on the assumption that the quantity of supplied urea is at the lower limit of the allowable range. In the case where the quantity of supplied urea is at the lower limit of the allowable range while the injection valve 4 is in order, the NOx removal rate, which changes with time, can be obtained by estimating the quantity of ammonia absorbed in the catalyst 3. Alternatively, it can be obtained by an experiment. If the actual NOx removal rate after the lapse of the predetermined period of time since the completion of the supply of an increased quantity of urea is lower than the threshold value, it may be determined that there is an abnormality in the injection valve 4.

When the catalyst 3 is deteriorated, ammonia is difficult to be absorbed by the catalyst 3 even if the quantity of supplied urea is sufficiently large. Therefore, the NOx removal rate is low at the time immediately after the completion of the supply of an increased quantity of urea, and thereafter the NOx removal rate continues to be constant at a low value. However, if urea is supplied in accordance with the quantity of NOx, an NOx removal rate higher than the threshold value can be achieved, even when the catalyst is deteriorated. From this follows that cases in which there is an abnormality in the injection valve 4 and cases in which the catalyst 3 is deteriorated can be discriminated based on the NOx removal rate.

Figure 5:
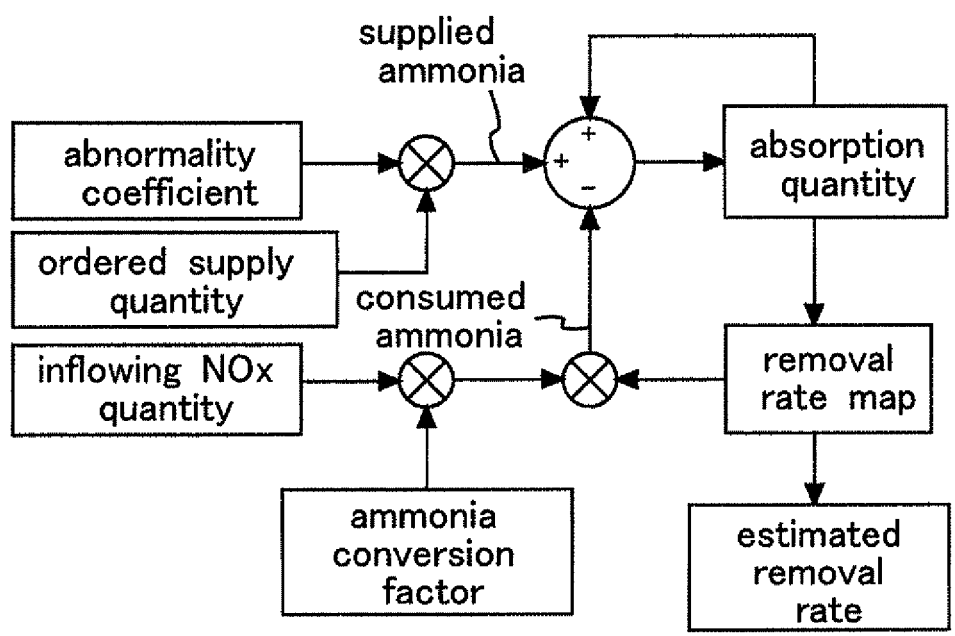
FIG. 5 is a block diagram for estimation of the NOx removal rate.

FIG. 5 is a block diagram for estimation of the NOx removal rate. The NOx removal rate mentioned here is that in the case where the quantity of supplied urea is at the lower limit of the allowable range while the injection valve 4 is in order. Alternatively, it may be the estimated value of the NOx removal rate at the time when the condition of the injection valve 4 is on the border between normal (or in order) and abnormal.

The ordered supply quantity refers to the quantity of urea to be supplied that is calculated by the ECU 10. The abnormality coefficient refers to the ratio of the supply quantity with the injection valve 4 having an abnormality to the supply quantity with the injection valve 4 at the time when it was brand-new. The abnormality coefficient is set depending on how much decrease in the supply quantity is to be set as a criterion for the determination as to whether there is an abnormality in the injection valve 4. The quantity of supplied urea in the abnormal condition may be set to the lower limit of the allowable range. Thus, the supply quantity at the time when the quantity of supplied urea is at the lower limit of the allowable range while the injection valve 4 is in order (or normal) can be obtained by multiplying the ordered supply quantity by the abnormality coefficient. In FIG. 5, the quantity of supplied ammonia in the abnormal condition is indicated by "SUPPLIED AMMONIA". The abnormality coefficient differs between types of the internal combustion engine 1 and between types of the exhaust gas purification system.

In FIG. 5, the inflowing NOx quantity refers to the quantity of NOx flowing into the catalyst 3. The ammonia conversion factor is the quantity of ammonia needed to reduce unit mass of NOx. Thus, the quantity of ammonia needed to reduce the inflowing NOx quantity can be obtained by multiplying the inflowing NOx quantity by the ammonia conversion factor.

Figure 6:
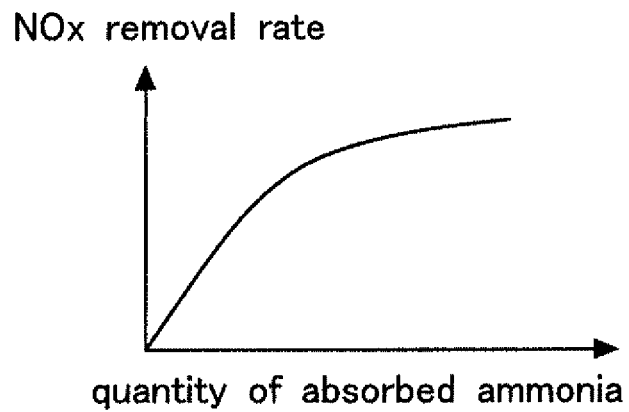
FIG. 6 is a graph showing the relationship between the quantity of absorbed ammonia and the NOx removal rate.

The removal rate map is a representation of the relationship between the quantity of absorbed ammonia and the NOx removal rate in the form of a map. FIG. 6 is a graph showing the relationship between the quantity of absorbed ammonia and the NOx removal rate. This relationship can be obtained by, for example, an experiment. The larger the quantity of absorbed ammonia is, the higher the NOx removal rate is, though the lower the rate or gradient of increase in the NOx removal rate is. The quantity of consumed ammonia depends on the NOx removal rate. In other words, a quantity of ammonia that depends on the inflowing NOx quantity and the removal rate map is actually consumed in the catalyst 3. In FIG. 5, this actual ammonia consumption quantity is indicated by "CONSUMED AMMONIA".

The absorption quantity mentioned in FIG. 5 refers to the quantity of ammonia absorbed in the catalyst 3. The absorption quantity changes depending on the "supplied ammonia"

and the "consumed ammonia". Specifically, the current absorption quantity can be calculated by adding the "supplied ammonia" and subtracting the "consumed ammonia" to/from the past absorption quantity.

The estimated removal rate refers to the estimated value of the NOx removal rate at the current time. The NOx removal rate at the current time is estimated based on the absorption quantity and the removal rate map.

The change in the NOx removal rate while the quantity of supplied urea is at the lower limit of the allowable range can be obtained from the estimated removal rate. In this embodiment, the ECU 10 that estimates the NOx removal rate in the above-described manner corresponds to the estimation unit in the present invention.

In the calculation of the estimated removal rate, it may be assumed that ammonia is not absorbed in the catalyst 3 at all at the time of start-up of the internal combustion engine 1. In other words, the initial value of the absorption quantity in FIG. 5 may be set to 0 (zero). Then, the estimation is done in the worst condition in terms of exhaust gas purification. When there is no abnormality in the injection valve 4, a condition in which a certain quantity of ammonia is absorbed in the catalyst 3 is maintained. In some cases, a certain quantity of ammonia is absorbed in the catalyst 3 at the time of start-up of the internal combustion engine 1.

In this embodiment, the supply of an increased quantity of urea is performed if a condition is met, irrespective of how much the actual initial value of the absorption quantity is. In the case where the initial value of the absorption quantity is set to 0 (zero), the time taken for the NOx removal rate to fall to the threshold value is made shorter as compared to that in the case where the actual absorption quantity is larger than 0. In other words, the period from time B to time C in FIG. 4 is made shorter, and the time at which a determination of abnormalities of the injection valve 4 is performed is made earlier. Then, even if there is an abnormality in the injection valve 4, it is possible that the determination of abnormalities is made before the actual NOx removal rate reaches the threshold value. If this is the case, it is determined that there is no abnormality in the injection valve 4. However, this causes no problems with the exhaust gas purification, because the actual. NOx removal rate is higher than the threshold value. Furthermore, since the purpose of estimating the NOx removal rate in the block diagram of FIG. 5 is only to determine the time at which the determination of abnormalities is to be made, it is not necessary to determine the actual NOx removal rate accurately.

As described above, the condition in which the initial value of the absorption quantity is 0 is the worst condition for the exhaust gas purification. If the actual NOx removal rate is not lower than the threshold value in this condition, it may be determined that there is no abnormality in the injection valve 4. In addition, since the time period from time B to time C in FIG. 4 is made shorter, a determination of abnormalities of the injection valve 4 can be made earlier.

Figure 7:
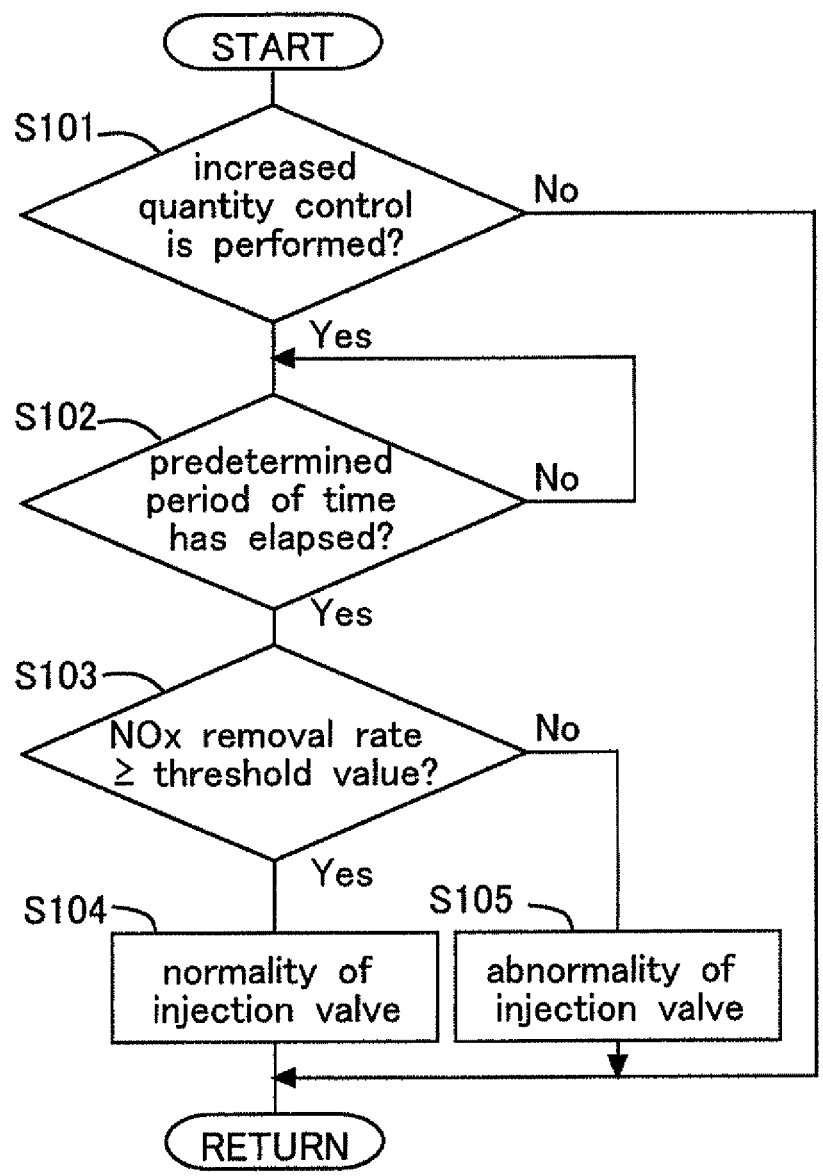
FIG. 7 is a flow chart showing a flow of determining an abnormality in the injection valve in embodiment 1.

FIG. 7 is a flow chart of a flow of determining abnormalities in the injection valve 4 in this embodiment. This routine is executed at regular intervals.

In step S101, it is determined whether or not a control for supplying an increased quantity of urea through the injection valve 4 is performed. In other words, it is determined whether or not a state in which a certain quantity of ammonia is absorbed in the catalyst 3 is achieved. If the determination in step S101 is affirmative, the process proceeds to step S102, and if the determination is negative, this routine is terminated.

In step S102, it is determined whether or not a predetermined period of time has been elapsed since the completion of the control for supplying an increased quantity of urea through the injection valve 4. In other words, it is determined whether or not a time taken for abnormalities, if any, of the injection valve 4 to affect the NOx removal rate has been elapsed. In still other words, it is determined whether or not it is time C shown in FIG. 4. If the determination in step S102 is affirmative, the process proceeds to step S103, and if the determination is negative, the process of step S102 is executed again.

In step S103, it is determined whether or not the actual NOx removal rate is equal to or higher than a threshold value. The actual NOx removal rate is calculated based on the first NOx sensor 6 and the second NOx sensor 8. If the determination in step S103 is affirmative, the normality of the injection valve 4 is memorized in step S104. If the determination in step S103 is negative, the abnormality of the injection valve is memorized in step S105.

As described in the foregoing, in this embodiment, an abnormality in the injection valve 4 can be determined based on the NOx removal ratio that changes with time. In other words, it can be determined whether or not there is a shortage in the supply of urea. In doing so, abnormalities can be discriminated from a deterioration of the catalyst 3. Furthermore, since the determination can be made using an existing NOx sensor, no device needs to be added separately. Furthermore, since no special operation condition needs to be established when making a determination of abnormalities of the injection valve 4, the determination can be made quickly.

Although an NOx selective reduction catalyst using ammonia as a reducing agent has been described in this embodiment, the present invention can also be applied to NOx selective reduction catalysts using other reducing agents (e.g. HC).

Embodiment 2

In this embodiment, it is determined whether an abnormality of the injection valve 4 or a deterioration of the catalyst 3 is occurring, in cases where the quantity of supplied ammonia is feedback-controlled.

The higher the degree of deterioration of the catalyst 3 is, the smaller the quantity of ammonia absorbed by the catalyst 3 is, and accordingly the larger the quantity of ammonia slipping through the catalyst 3 without being absorbed by it is. The second NOx sensor 8 detects NOx and ammonia. Therefore, as the deterioration of the catalyst 3 progresses, the quantity of ammonia slipping through the catalyst increases, and therefore the output value of the second NOx sensor 8 becomes higher. In consequence, the apparent NOx removal rate calculated by the ECU 10 decreases.

In this embodiment, the urea supply quantity is feedback-controlled in such a way as to maximize the NOx removal rate. This feedback-control of the urea supply quantity is performed in the following manner, for example. The output value of the second NOx sensor 8 increases as NOx slips through the catalyst 3 and as ammonia slips through the catalyst 3. Therefore, the NOx removal rate decreases as NOx slips through the catalyst 3 and as ammonia slips through the catalyst 3.

Here, the ratio of the actual ammonia supply quantity to the quantity of ammonia needed to fully reduce the NOx flowing into the catalyst 3 (which ratio will be hereinafter referred to as the supply ratio) will be considered. When the catalyst 3 is not deteriorated and the supply ratio is 1, a quantity of ammonia that is just adequate to reduce NOx is supplied, and consequently the NOx removal rate becomes highest. As the supply ratio decreases from 1, the quantity of NOx that is not reduced because of a shortage of ammonia increases, and consequently the quantity of NOx measured by the second NOx sensor increases. Hence, the NOx removal rate decreases. On the other hand, as the supply ratio increases from 1, the quantity of ammonia slipping through the catalyst 3 increases due to a surplus of ammonia. Then, since ammonia is also detected by the second NOx sensor 8, the apparent NOx removal rate decreases. Therefore, the NOx removal rate is highest when the supply ratio is 1, and the NOx removal rate decreases as the supply ratio decreases or increases away from 1.

On the other hand, when the catalyst 3 is deteriorated and the supply ratio is 1, ammonia that is not absorbed due to the deterioration slips through the catalyst 3, and consequently the second NOx sensor 8 detects ammonia. As the supply ratio increases from 1, the quantity of ammonia slipping through the ammonia increases. On the other hand, as the supply ratio decreases from 1, the quantity of ammonia slipping through the catalyst 3 decreases. Therefore, in the range of the supply ratio near the value of 1, the apparent NOx removal rate increases as the supply ratio decreases. However, if the supply ratio becomes too low, an influence of the quantity of unreduced NOx becomes large. Therefore, when the supply ratio becomes low beyond a certain extent, the NOx removal rate decreases as the supply ratio decreases. Therefore, when the catalyst 3 is deteriorated, the NOx removal rate becomes highest at a supply ratio lower than 1. Normally, urea is supplied in such a way that the supply ratio becomes equal to 1. Then, if the NOx removal rate decreases as the supply ratio is decreased from 1, it may be determined that the catalyst 3 is not deteriorated, and if the NOx removal rate increases as the supply ratio is decreased from 1, it may be determined that the catalyst 3 is deteriorated.

As above, changing the quantity of supplied urea causes a change in the NOx removal ratio. Furthermore, it can be determined whether the NOx removal rate is increased by increasing or decreasing the quantity of supplied urea. Therefore, a feedback control of the urea supply quantity can be performed based on this. In this embodiment, the ECU 10 that performs the feedback control of the urea supply quantity corresponds to the feedback control unit in the present invention.

When the urea supply quantity is feedback-controlled based on the NOx removal rate and there is an abnormality in the injection valve 4, a compensation is made in such a way as to increase the urea supply quantity, because increasing the urea supply quantity makes the actual supply ratio closer to 1. On the other hand, when the catalyst 3 is deteriorated, a compensation is made in such a way as to decrease the urea supply quantity, because the NOx removal rate becomes highest at a supply ratio lower than 1.

As above, since the direction of compensation of the urea supply quantity differs between when there is an abnormality in the injection valve 4 and when the catalyst 3 is deteriorated, it is possible to determine, based on the compensation value, whether an abnormality of the injection valve 4 or a deterioration of the catalyst 3 is occurring. If the compensation value is a value for increasing the urea supply quantity, it may be determined that there is an abnormality in the injection valve 4, and if the compensation value is a value for decreasing the urea supply quantity, it may be determined that the catalyst 3 is deteriorated. Since this feedback control can be performed only in a limited operation condition, the feedback control cannot be performed at all the time.

Figure 8:
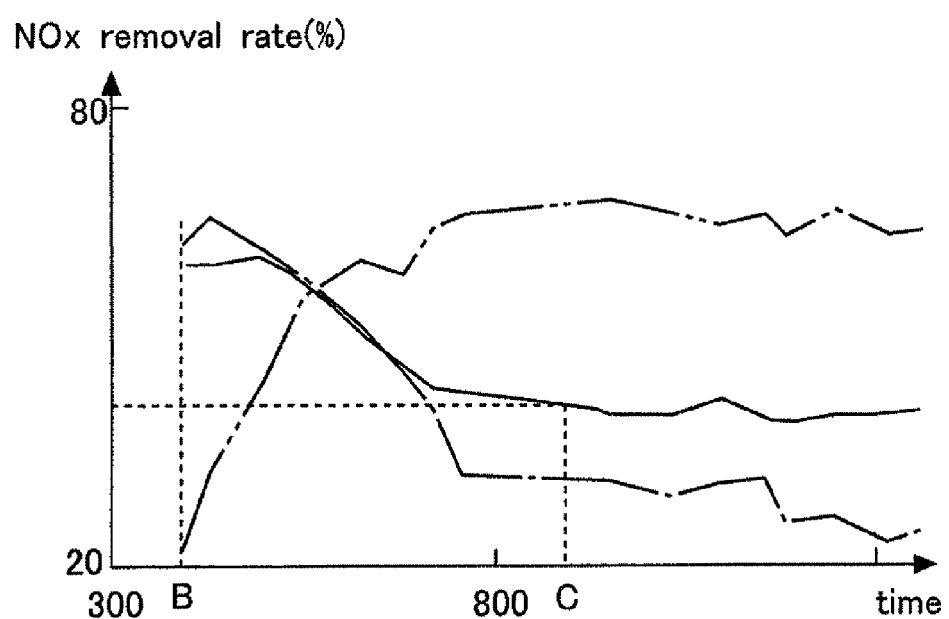
FIG. 8 is a time chart showing the change in the NOx removal rate with time when a feedback control of the urea supply quantity is not performed.
Figure 9:
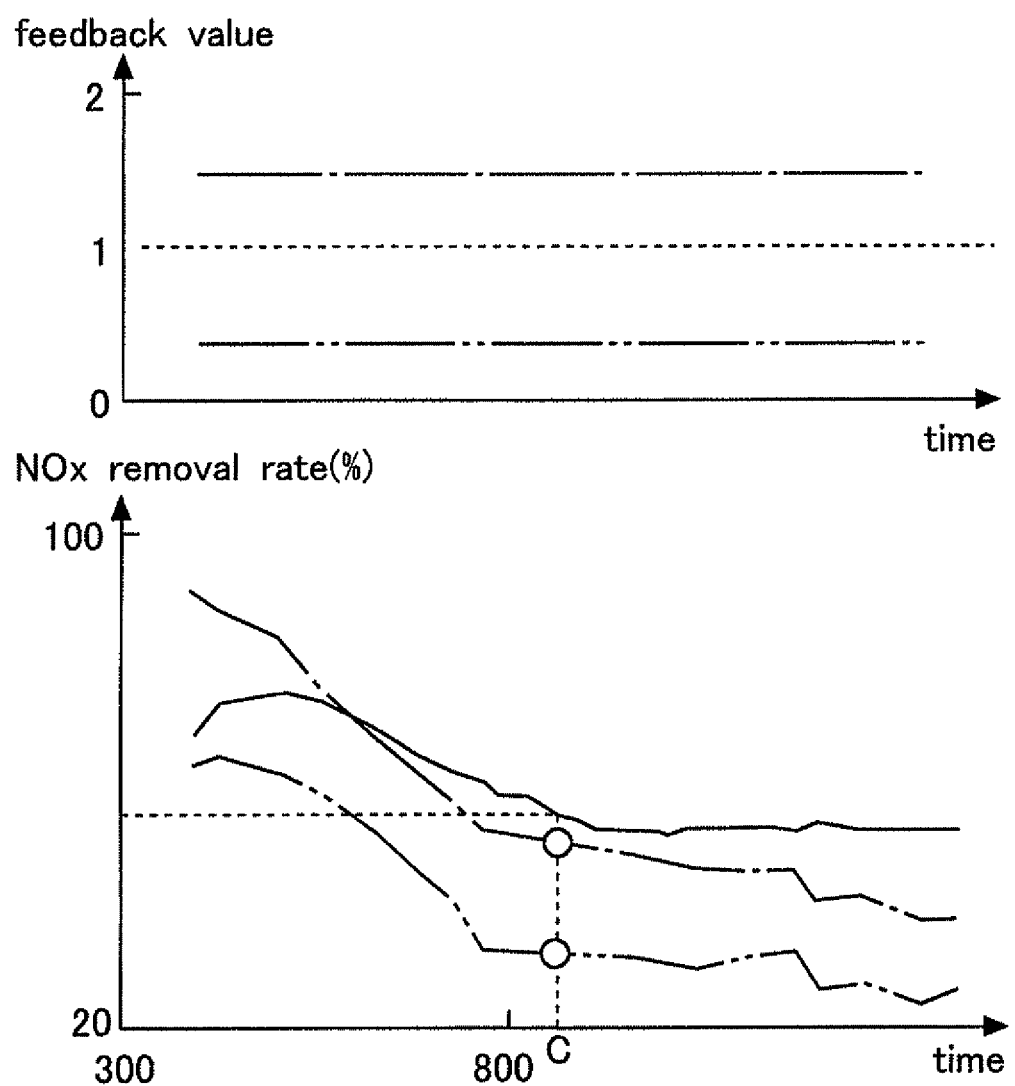
FIG. 9 is a time chart showing the change in the NOx removal rate and the change in a feedback value (compensation factor) for the urea supply quantity with time when the feedback control of the urea supply quantity is performed.

FIG. 8 is a time chart showing the change in the NOx removal rate with time while the feedback control of the urea supply quantity is not performed. This may be the case described in embodiment 1. On the other hand, FIG. 9 is a time chart showing the change in the NOx removal rate and the change in the feedback value (compensation factor) for the urea supply quantity with time while the feedback control of the urea supply quantity is performed. In FIGS. 8 and 9, the solid curves are for the case where the urea supply quantity is at the lower limit of the allowable range while the injection valve 4 and the catalyst 3 are in order. The alternate long and short dashed curves are for the case where there is an abnormality in the injection valve 4 and the catalyst 3 is in order. The chain double-dashed curves are for the case where the injection valve 4 is in order and the catalyst 3 is deteriorated. The time period from time B to time C is the predetermined period of time mentioned in embodiment 1.

When the feedback control of the urea supply quantity is not performed (FIG. 8), the NOx removal rate at time C distinctly differs between the case of a deterioration of the catalyst 3 and the case of an abnormality in the injection valve 4. Therefore, the two cases can be discriminated from each other based only on the NOx removal rate. As the catalyst 3 is deteriorated, the apparent NOx removal rate is low in the vicinity of time point B due to the slipping of ammonia through the catalyst 3. Thereafter, the slipping of ammonia decreases because the ammonia supply quantity is adapted to the quantity of NOx. In consequence, the NOx removal rate increases with time and converges to a value that depends on the degree of deterioration of the catalyst 3. Then, the NOx removal rate is higher than that in the case where there is an abnormality in the injection valve 4. Thus, cases where the catalyst 3 is deteriorated can be discriminated from cases where there is an abnormality in the injection valve 4 based on the rise in the NOx removal rate with the lapse of time.

However, when the feedback control of the urea supply quantity is performed (FIG. 9), deteriorations in the catalyst 3 and abnormalities in the injection valve 4 cannot be discriminated based only on this, because the NOx removal rate at time C is lower than the threshold value in both the cases.

Here, the feedback value for the urea supply quantity is taken into consideration. The feedback value is used as a factor multiplying the urea supply quantity. Therefore, when the feedback value is smaller than 1, the urea supply quantity is decreased. On the other hand, when the feedback value is larger than 1, the urea supply quantity is increased.

Therefore, when the feedback value is larger than 1, it may be determined that there is an abnormality in the injection valve 4 because there is a shortage in the supply of ammonia. When the feedback value is smaller than 1, it may be determined that the catalyst 3 is deteriorated because ammonia is slipping through it.

Figure 10:
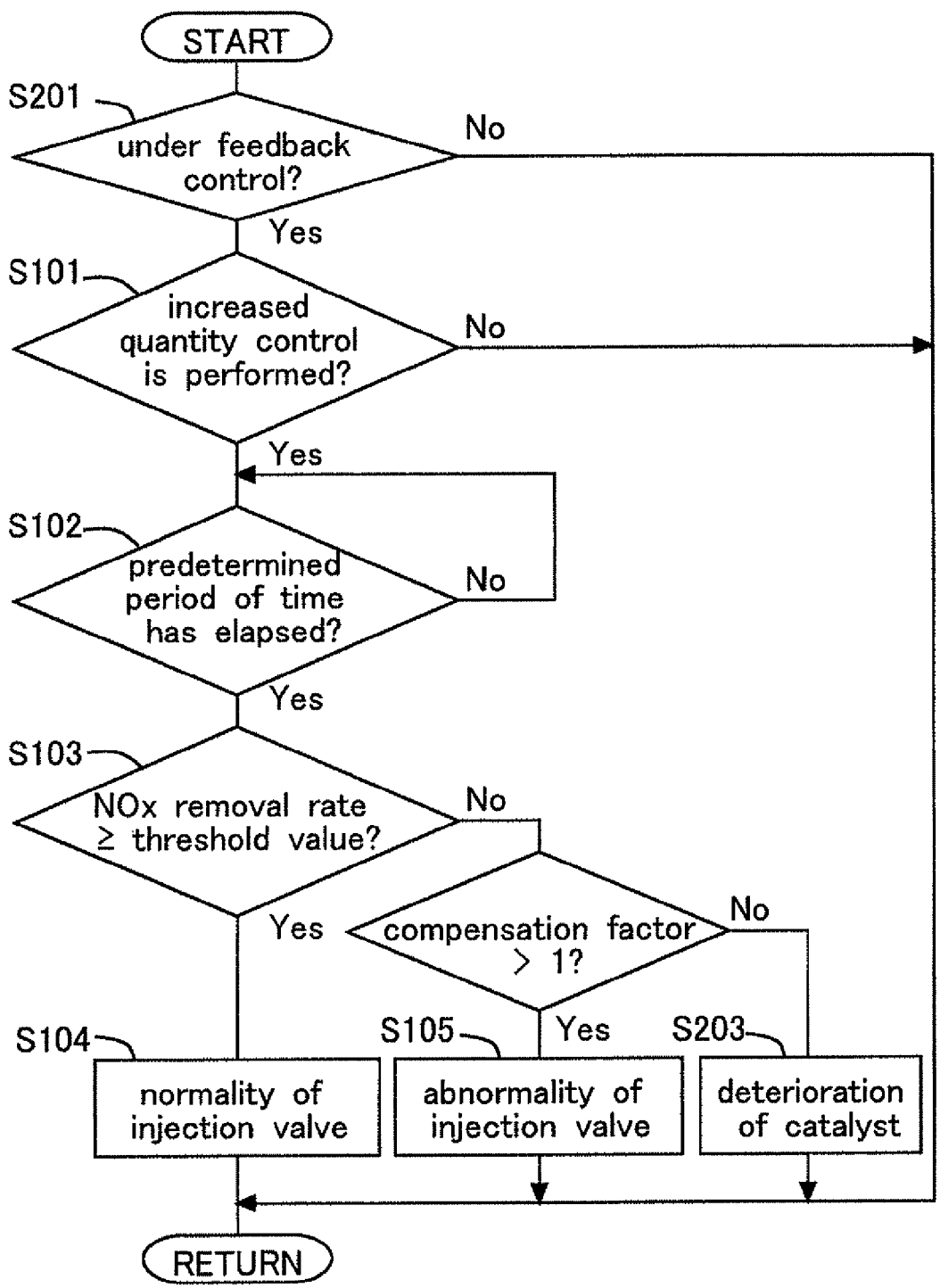
FIG. 10 is a flow chart showing a flow of determining an abnormality in an injection valve in embodiment 2.

FIG. 10 is a flow chart showing a flow of determining abnormalities in the injection valve 4 in this embodiment. This routine is executed at regular intervals. The steps in which the processes same as those in the flow shown in FIG. 7 are executed are denoted by the same symbols to eliminate descriptions.

In step S201, it is determined whether or not the feedback control of the urea supply quantity is performed. If the determination in step S201 is affirmative, the process proceeds to step S101, and if the determination is negative, this routine is terminated because the flow shown in FIG. 7 will do.

In step S202, it is determined whether or not the compensation factor for the urea supply quantity is larger than 1. In this step, whether the urea supply quantity is increased or not is determined. In cases where the feedback control is performed by addition/subtraction of a value to/from the base value, it is determined whether or not the compensation value is positive.

If the determination in step S202 is affirmative, the process proceeds to step S105, where the abnormality of the injection valve 4 is memorized. If the determination in step S202 is negative, the process proceeds to step S203, where the deterioration of the catalyst 3 is memorized.

As described in the foregoing, in this embodiment, abnormalities of the injection valve 4 and deteriorations of the catalyst 3 can be discriminated from each other even while the feedback control of the urea supply quantity is performed.

The invention claimed is:

1. An abnormality detection apparatus for an exhaust gas purification apparatus, comprising:
   a NOx selective reduction catalyst provided in an exhaust passage of an internal combustion engine and configured to selectively reduce NOx with a reducing agent;
   a reducing agent injector configured to supply the reducing agent from upstream of the NOx selective reduction catalyst;
   a downstream NOx quantity sensor configured to detect a quantity of NOx in the exhaust passage downstream of the NOx selective reduction catalyst;
   an upstream NOx quantity sensor configured to detect a quantity of NOx in the exhaust passage upstream of the NOx selective reduction catalyst; and
   an electronic control unit configured to:
   (i) calculate a NOx removal rate in the NOx selective reduction catalyst based on the quantity of NOx detected by the downstream NOx quantity sensor and the quantity of NOx detected by the upstream NOx quantity sensor,
   (ii) determine whether or not a quantity of the reducing agent absorbed in the NOx selective reduction catalyst is equal to or larger than a predetermined quantity on the assumption that there is no abnormality in the reducing agent injector,
   (iii) calculate a supply quantity of the reducing agent that is needed to reduce the quantity of NOx detected by the upstream NOx quantity sensor, and
   (iv) determine an abnormality of the reducing agent injector based on the NOx removal rate after a lapse of a predetermined period of time since starting the supply of the reducing agent after it is determined that the quantity of the reducing agent absorbed in the NOx selective reduction catalyst is equal to or larger than the predetermined quantity.

2. An abnormality detection apparatus for an exhaust gas purification apparatus according to claim 1, wherein the electronic control unit is further configured to determine, after a condition is established that makes the quantity of the reducing agent absorbed in the NOx selective reduction catalyst smaller than the predetermined quantity, that a quantity of the reducing agent equal to or larger than the predetermined quantity is absorbed in the NOx selective reduction catalyst if an increased quantity of the reducing agent has been supplied that is larger than the amount supplied in a case when the condition has not been established.

3. An abnormality detection apparatus for an exhaust gas purification apparatus according to claim 1, wherein the electronic control unit is further configured to estimate a time change in the NOx removal rate when the quantity of the reducing agent supplied through the reducing agent injector reaches a lower limit of an allowable range, wherein the predetermined period of time is an estimated time taken for the NOx removal rate to decrease to a threshold value since the detection of the supply of the reducing agent.

4. An abnormality detection apparatus for an exhaust gas purification apparatus according to claim 3, wherein the NOx removal rate is estimated with an initial value of the quantity of the reducing agent absorbed in the NOx selective reduction catalyst set to 0 (zero).

5. An abnormality detection apparatus for an exhaust gas purification apparatus according to claim 1, wherein the electronic control unit is further configured to determine that there is an abnormality in the reducing agent injector if the NOx removal rate is lower than a threshold value after the lapse of the predetermined period of time.

6. An abnormality detection apparatus for an exhaust gas purification apparatus according to claim 1, wherein the electronic control unit is further configured to determine a degree of decrease in the NOx removal rate from (i) the NOx removal rate at the time when the supply of the quantity of the reducing agent is started and (ii) the NOx removal rate after the lapse of the predetermined period of time, and the electronic control unit is configured to determine that there is an abnormality in the reducing agent injector if the degree of decrease in the NOx removal rate is larger than a threshold value.

7. An abnormality detection apparatus for an exhaust gas purification apparatus according to claim 1, wherein:
   the downstream NOx quantity sensor is further configured to detect the quantity of the reducing agent, and
   the electronic control unit is further configured to:
   use the quantity of the reducing agent detected by the downstream NOx quantity sensor as the quantity of NOx when calculating the NOx removal rate,
   perform a feedback control of the quantity of the reducing agent supplied by the reducing agent injector based on the NOx removal rate, and
   when it is determined that there is an abnormality in the reducing agent injector, if the quantity of the reducing agent is made smaller than a base value, the electronic control unit determines that there is not an abnormality in the reducing agent injector but the NOx selective reduction catalyst is deteriorated.

8. An abnormality detection method for an exhaust gas purification apparatus comprising:
   a first step of determining whether or not a quantity of reducing agent equal to or larger than a predetermined quantity is absorbed in a NOx selective reduction catalyst provided in an exhaust passage of an internal combustion engine on the assumption that there is no abnormality in the quantity of supplied reducing agent;
   a second step of supplying a quantity of reducing agent needed to reduce NOx flowing into the NOx selective reduction catalyst, after it is determined in the first step that a quantity of the reducing agent equal to or larger than the predetermined quantity is absorbed in the NOx selective reduction catalyst; and
   a third step of determining a shortage in supply of the reducing agent based on a NOx removal rate after a lapse of a predetermined period of time since the start of the second step.

9. An abnormality detection method for an exhaust gas purification apparatus according to claim 8 wherein in the first step, it is determined, after a temperature of the NOx selective reduction catalyst has risen to a desorption temperature of the reducing agent, that a quantity of the reducing agent equal to or larger than the predetermined quantity is absorbed in the NOx selective reduction catalyst, if an increased quantity of the reducing agent larger than that during the time in which the temperature of the NOx selective reduction catalyst is lower than the desorption temperature is supplied.

10. An abnormality detection method for an exhaust gas purification apparatus according to claim 8, wherein in the third step it is determined that there is a shortage in supply of the reducing agent, if the NOx removal rate is lower than a threshold value.

* * * * *